(12) United States Patent
Ihde et al.

(10) Patent No.: US 7,091,449 B2
(45) Date of Patent: Aug. 15, 2006

(54) VOLTAGE REGULATED MIG WELDING USING A CONSTANT CURRENT POWER SOURCE

(75) Inventors: Jeffery R. Ihde, Greenville, WI (US); Brian L. Ott, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 210 days.

(21) Appl. No.: 10/605,022

(22) Filed: Sep. 2, 2003

(65) Prior Publication Data

US 2005/0045610 A1 Mar. 3, 2005

(51) Int. Cl.
*B23K 9/12* (2006.01)

(52) U.S. Cl. .................................. 219/137.71
(58) Field of Classification Search ........... 219/137.71, 219/130.31, 130.32, 130.33
See application file for complete search history.

(56) References Cited

U.S. PATENT DOCUMENTS

| | | | | |
|---|---|---|---|---|
| 2,636,102 A | * | 4/1953 | Lobosco | 219/137.71 |
| 3,968,340 A | * | 7/1976 | Fernicola | 219/130.4 |
| 3,978,311 A | * | 8/1976 | Toth | 219/137.71 |
| 4,301,355 A | * | 11/1981 | Kimbrough et al. | 219/137.71 |
| 4,584,457 A | * | 4/1986 | Dilthey et al. | 219/130.21 |
| 5,233,158 A | * | 8/1993 | Karakama et al. | 219/130.33 |
| 6,504,133 B1 | * | 1/2003 | Nowak et al. | 219/137.71 |

* cited by examiner

*Primary Examiner*—Clifford C. Shaw
(74) *Attorney, Agent, or Firm*—Ziolkowski Patent Solutions Group, SC

(57) ABSTRACT

A system and method of duplicating CV mode of operation with a CC power includes a wire feeder designed to automatically adjust the speed of which consumable wire is delivered to a weld so as to maintain a target voltage set by a user. The wire feeder is designed to be operational on a CC power source yet automatically adjust the WFS so that a user-selected target voltage is maintained at the weld. A controller within the wire feeder is programmed to read an input from the user to the wire feeder identifying a target voltage and control the speed by which a drive assembly delivers metal filler to the weld based on the target voltage. By automatically adjusting the WFS, the user is not required to manually adjust the WFS to maintain the target voltage at the weld.

21 Claims, 4 Drawing Sheets

VOLTAGE REGULATED MIG WELDING USING A CONSTANT CURRENT POWER SOURCE

BACKGROUND OF INVENTION

The present invention relates generally to welding systems and, more particularly, to a wire feeder connected to a constant current (CC) power source and designed to automatically adjust the speed by which consumable welding wire is delivered to a weld so as to maintain a target voltage at the weld.

Wire feeders are typically used to feed metal wire into a weld during a welding process such as Gas Metal Arc Welding (GMAW) and other welding processes. Typical wire feeders have a drive roller assembly for driving the metal feed from a feed spindle through a welding gun for introduction to the weld. Power is supplied to the drive roller assembly by a welding power supply via a weld cable. The amperage or current generated by the power supply governs the speed in which the metal feed is fed to the weld, or the wire feed speed (WFS). Generally, the higher the amperage supplied to the wire feeder, the greater the WFS. Conversely, if voltage is used to govern the WFS, the lower the voltage, the higher the WFS. Accordingly, the speed by which the wire feeder supplies the filler metal to the weld is a direct function of the power delivered to the wire feeder and therefore, the weld. The thickness of the metal being welded determines the power required at the weld and thus the WFS necessary to deliver that power. A thicker metal requires higher power to effectively weld.

Typically, power sources, which may be designed to supply power to the wire feeder, have been constructed to operate in either a constant current (CC) mode or a constant voltage (CV) mode. For those welding applications that require a constant current input to the wire feeder, the wire feeder is connected to a CC power source. Conversely, for those welding applications that require a constant voltage at a weld, the wire feeder is connected to a CV power source. For CC mode of operation, the user is able to adjust the speed by which metal filler or consumable electrode is delivered to a weld so as to maintain a desired voltage at the weld. Conversely, for a CV mode of operation, the user may adjust the wire feed speed to maintain a target current level at the weld. Wire feed speed (WFS) and voltage at the weld are inversely related therefore to increase the arc voltage at the weld, the WFS must be decreased and to lower the voltage at the weld, the WFS must be increased. In contrast, WFS and current are directly related and, as such, an increase in WFS will cause an increase in current and vice versa.

For most GMAW welding applications, it is necessary that the wire feeder be connected to a CV power source. For example, short circuit transfer is a welding application that is characterized by a less than 21 volt arc voltage. With a CV power source, the user is able to set a desired target voltage that may be less than 21 volts and adjust the speed by which wire is delivered to the weld to control output current. Accordingly, the user may increase output current by increasing WFS while the voltage at the weld is held at the target level by the CV power source. In contrast, CC power sources are typically not usable for short circuit transfer applications.

CC power sources are designed to maintain a constant output current level. The user inputs a desired target current level on the power source and the operational circuitry of the power source operates to maintain an output current level. The user may then adjust the WFS to regulate a voltage at the weld. To increase the voltage at the weld, the WFS is decreased. To decrease the voltage, the WFS is increased. If the weld is underpowered, the weld will be insufficient to adequately join the materials being welded. On the other hand, if the weld is overpowered, it is possible to "burn through" the materials being welded. As such, the user must proactively monitor the weld and adjust the WFS accordingly.

Typically, however, the wire feeder will control the WFS within a limited range of values. As a result, when the wire feeder is operating on a CC power source, the user may be unable to get a desired voltage level at the weld. For instance, for short circuit transfer applications, an arc voltage of less than 21 volts is generally required. However, achieving an arc voltage of less than 21 volts may not be possible given the constant current level being maintained by the power source. That is, at the current level selected by the user, additional power may be needed at the weld to sufficiently fuse the materials. To increase the power at the weld, the user will decrement the WFS to increase the arc voltage. Because the wire feeder has a limited range of acceptable WFS values, it may not be possible for the user to decrement the WFS to a level needed to adequately increase the arc voltage. As a result, the weld is underpowered and the materials may not be properly fused. Similarly, to prevent "burn through" the user may seek to increase the WFS to drive the voltage downward to a level that is not permitted by the wire feeder.

Therefore, to carry out a particular short circuit transfer application, a CV power source may be required which increases equipment costs and accentuates the under-utilization of the CC power source. Additionally, multiple power sources increases the costs associated with maintenance as well as storage.

It would therefore be desirable to have a system and method capable of duplicating CV mode of operation with a CC power source.

BRIEF DESCRIPTION OF INVENTION

The present invention provides a system and method of duplicating CV mode of operation with a CC power source that overcomes the aforementioned drawbacks. The invention includes a wire feeder designed to automatically adjust the speed of which consumable wire is delivered to a weld so as to maintain a target arc voltage set by a user. The wire feeder is designed to be operational on a CC power source yet adjust the WFS so that a user-selected target voltage is maintained at the weld. A controller within the wire feeder is programmed to read an input from the user to a control panel on the wire feeder identifying a target voltage and control the speed by which a drive assembly delivers metal filler to the weld based on the target voltage. The target voltage is preferably set to a value such that the weld is sufficiently powered to properly fuse materials at the weld. By automatically adjusting the WFS, the user is not required to manually adjust the WFS to maintain the target voltage at the weld.

Therefore, in accordance with one aspect of the present invention, a wire feeder for a MIG welding system includes a power input configured to receive power at a substantially constant current level from a power source. The wire feeder also includes a drive assembly configured to introduce a consumable electrode to a weld at a WFS as well as a controller to set an initial WFS based on a user input. The controller is also configured to automatically adjust the WFS to reduce a difference between a target arc voltage and an actual arc voltage.

According to another aspect of the present invention, a MIG welding system includes a power source configured to provide a constant current output. The welding system further includes a wire feeder connected to receive a constant current output and configured to deliver a consumable electrode to a weld at a WFS and automatically adjust the WFS to maintain the target voltage at the weld.

In accordance with yet a further aspect of the present invention, a controller is provided to regulate output of a wire feeder. The controller is programmed to set an initial WFS and a target arc voltage for a CC welding process. The controller is further programmed to monitor a voltage level at a weld during the CC welding process and adjust WFS if the voltage level at the weld deviates from the target arc voltage.

In accordance with another aspect of the present invention, a method of executing a constant current welding process is provided. The method includes the steps of receiving voltage feedback of a voltage at a weld and comparing the value of actual voltage at the weld to a target voltage. The method further includes a step of adjusting a speed of which consumable welding wire is delivered to the weld to reduce the difference between actual voltage and the target voltage.

In accordance with yet another aspect of the invention, a controller is configured to regulate operating parameters of a wire feeder connected to a CC power source so as to duplicate a CV welding process on the CC power source below an arc voltage level of approximately 22 volts.

According to another aspect, the present invention includes a wire feeder controller configured to receive a user input identifying a scaled representation of a voltage set point and determine a WFS from the scaled representation of the voltage set point.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
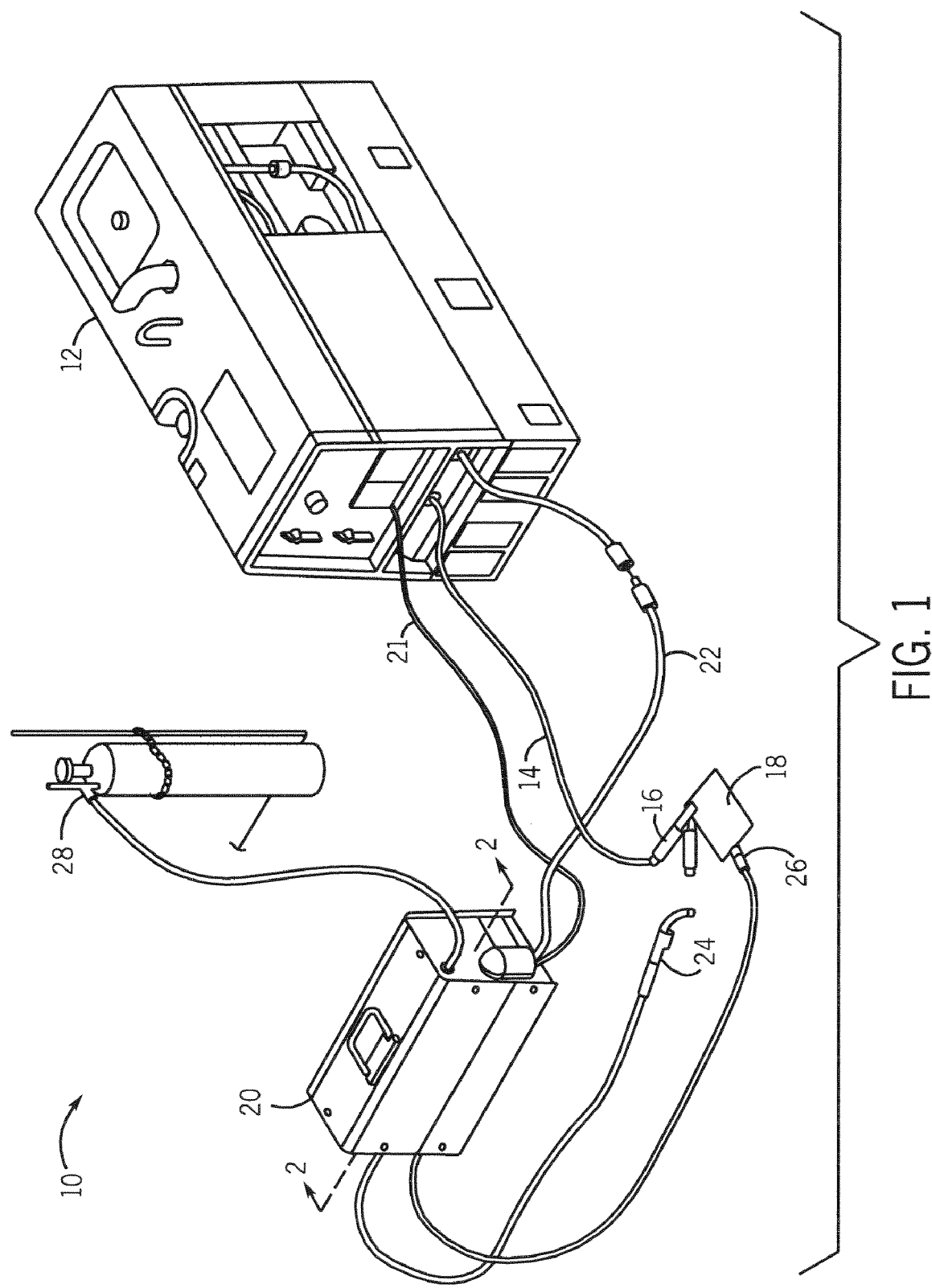
FIG. 1 is a perspective view of a welding system.

Referring to FIG. 1, a welding-type system 10 is shown incorporating the present invention. System 10 includes a power source 12, which can be an AC or a DC welding power supply operable in a constant current (CC) mode. The power source 12 has a work cable 14 and clamp 16 designed to hold a workpiece 18 for welding. Power source 12 is connected to a wire feeder 20 via cable 22. Connected between the power source 12 and the wire feeder 20 is a weld cable 22. The wire feeder 20, which in one embodiment is portable, also includes a welding torch or gun 24 and a voltage sensing lead with clip 26 configured to provide voltage at the weld feedback to the wire feeder. A shielding gas cylinder 28 is also connected to the wire feeder 20 to provide shielding gas for the welding process.

When the welding torch 24 is positioned proximate to workpiece 18, welding wire is fed into contact with the workpiece 18. Once triggered, an electrical current and voltage are generated to cause the welding wire to be heated and melt. As a result, an electrical arc is established which causes the welding wire to continue to melt as well as transfer the melted welding wire to the workpiece 18 where the welding wire fuses and cools with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting and improving bonding between the melted welding wire and the workpiece 18. As the welding torch 24 is translated across the workpiece 18, melted welding wire is continuously transferred to the workpiece 18. The wire feeder is designed to introduce flux cored, solid steel, or stainless steel welding wire to a weld. One skilled in the art would appreciate that these value are illustrative of only one particular welding assembly and that the present invention is equivalently applicable with other welding systems having different operating specifications.

Figure 2:
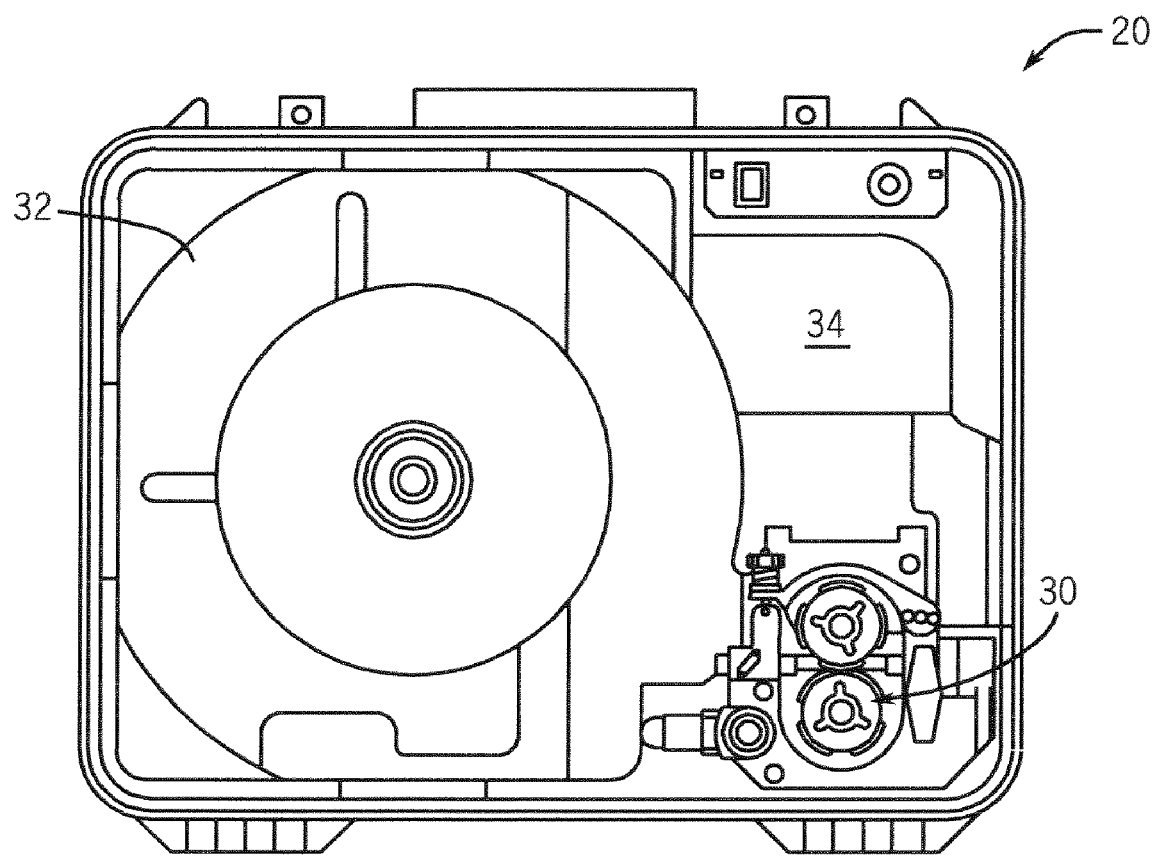
FIG. 2 is a sectional view of the wire feeder taken along lines 2—2 of FIG. 1.

Referring now to FIG. 2, the wire feeder 20 includes a wire drive assembly 30 to drive wire from a spool 32 designed to support welding wire (not shown) that is supplied to the weld under control of a controller 34 embodied in operational circuitry secured to a circuit board 34 that is connected to the power source 12 through cord 22, FIG. 1. The controller is governed by a microprocessor capable of being programmed to operate according to certain algorithms and/or programs. User selections or inputs received by the controller from a display and control panel, FIG. 3, and an internally programmed algorithm cause welding system 10 to operate according to the user selections.

Figure 3:
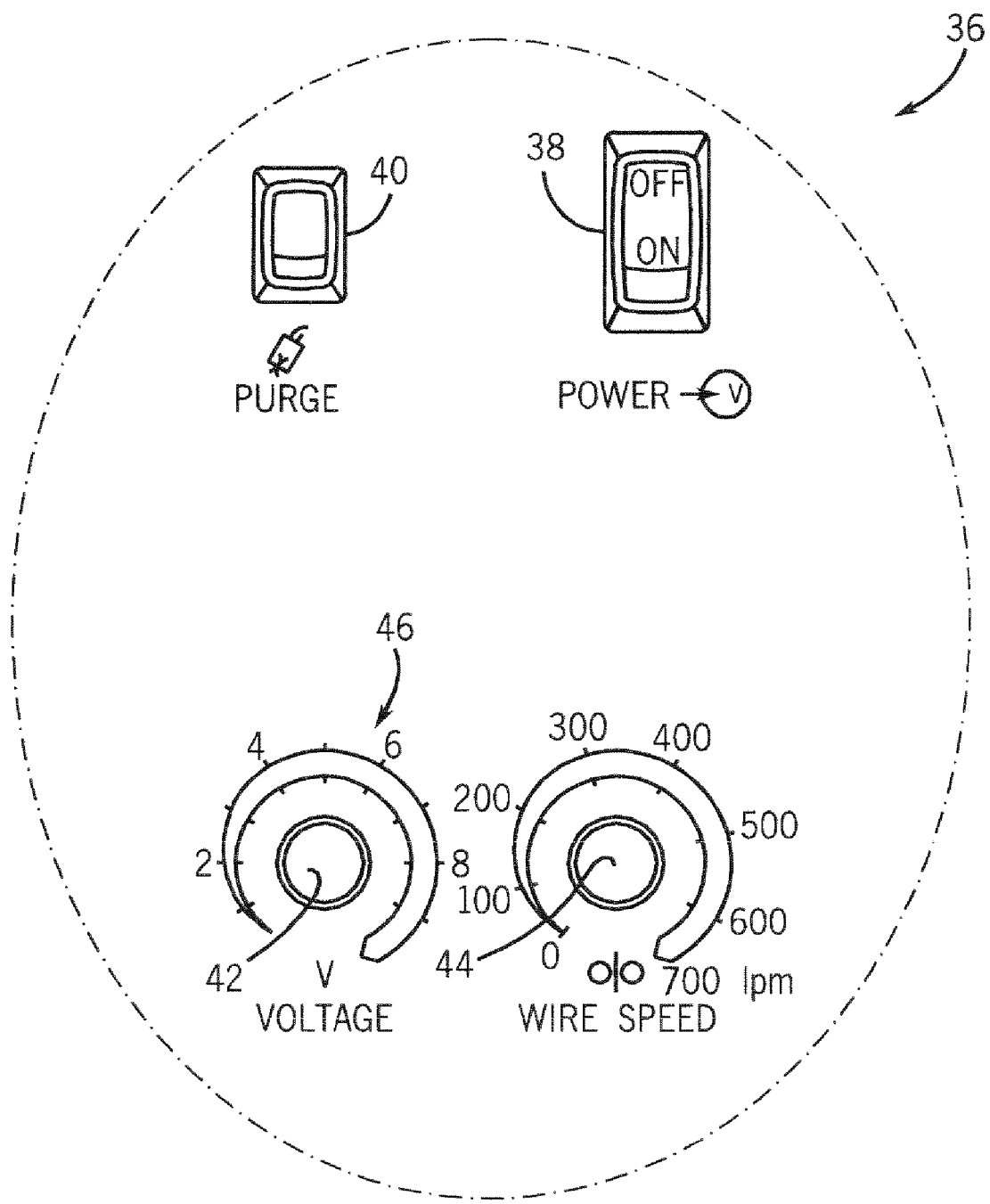
FIG. 3 is a front elevational view of a control panel of the wire feeder illustrated in FIG. 1.

Referring now to FIG. 3, a front elevational view of a control panel of a wire feeder is illustrated. Control panel 36 is designed to allow the user to input various welding parameters so as to define the welding process to be carried out. Specifically, the control panel includes a ON/OFF switch 38 that allows the user to switch the wire feeder on or off. Control panel 36 also includes a JOG/PURGE button or switch 40 that allows the user to purge or remove existing gas from the wire feeder. That is, the wire feeder includes a controller that detects activation of purge button 40 and in response thereto transmits a control signal to the gas valve assembly of the wire feeder to cause the drive assembly to purge any residual gas from the wire feeder. Control panel 36 also includes a JOG button that when selected causes the controller within the wire feeder to transmit a jog command to the drive assembly.

Control panel 36 also provides a user interface on the wire feeder that allows the user to set a target voltage via knob 42 as well as an initial wire feed speed via knob 44. One skilled in the art will appreciate that the functionality achieved with dual knobs 42 and 44 may also be achieved with a single telescoping knob. As will be described in greater detail below, the wire feed controller will regulate the drive assembly such that the target voltage selected via the user by adjusting knob 42 is substantially maintained at the weld. Additionally, the controller, based on user adjustment of wire feed speed knob 44, will set an initial speed by which welding wire is to be delivered to the weld. However, as will be described in greater detail below, the controller, based on feedback received from the weld, will automatically adjust the wire feed speed so that the target voltage selected by the user is maintained. It should be noted, in one embodiment, that a legend 46 associated with voltage adjustment knob 42 represents a scaled voltage level of the desired target voltage. That is, user adjustment of knob 42 to reference numeral 2 of legend 46 represents that the user desires the target voltage to be 20V.

Control panel 36 illustrated in FIG. 3 represents an example of a control panel which may be incorporated in the wire feeder. One skilled in the art will readily appreciate that the appearance and/or orientation of the selector switches, knobs, buttons, and the like may differ from that specifically illustrated. Additionally, LCDs and LEDs (not specifically shown) may also be utilized and are considered within the scope of the present invention. For example, control panel 36 may be constructed such that an LCD displays one or more menus that allow the user to interactively set the target arc voltage as well as the initial wire feed speed. In this regard, the user may navigate through a series of menus or windows that are displayed on the LCD in defining the operational parameters of the welding process to be carried out.

Figure 4:
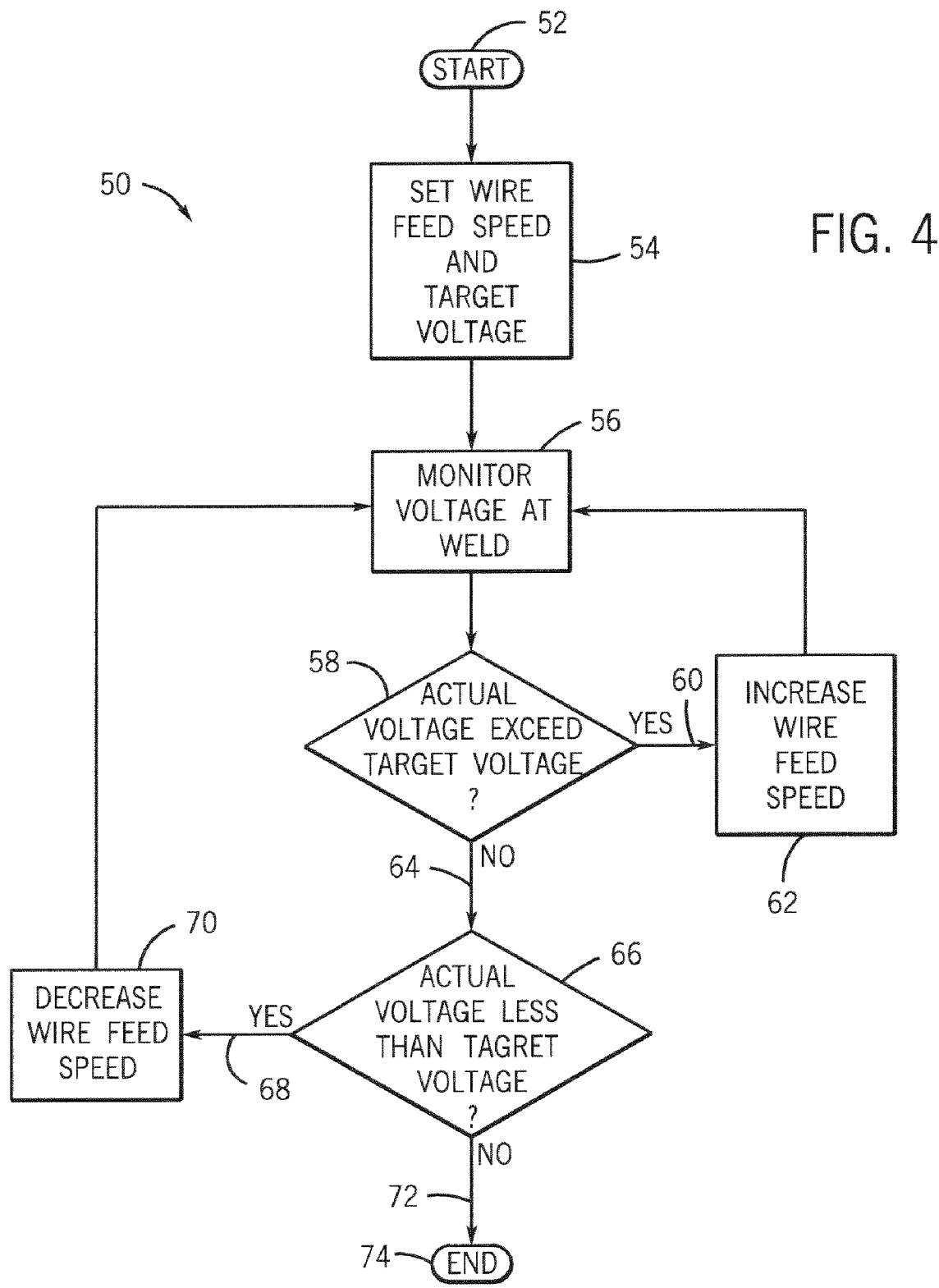
FIG. 4 is a flow chart setting forth the steps of a control algorithm carried out by a controller in the wire feeder for maintaining a target arc voltage based on a user input to the control panel illustrated in FIG. 2.

As noted above, the present invention provides a controller that is configured to automatically adjust the speed by which a consumable electrode is delivered to a weld so that a user selected target voltage is maintained. As such, a relatively constant arc voltage is achieved in addition to the constant current input provided to the wire feeder from the CC power source. Referring now to FIG. 4, a control technique or algorithm 50 for automatically maintaining a relatively constant voltage at a weld achieved by a controller within a wire feeder connected to a CC power source is illustrated. The technique or process 50 begins at step 52 with a user setting a constant current level on a CC power source as well as setting an initial wire feed speed and target voltage on a control menu on the wire feeder such as that illustrated in FIG. 3. The controller within the wire feeder executing process 50 then sets the initial WFS and target voltage based on the user selected inputs. The controller will then transmit a control signal to the drive assembly of the wire feeder such that wire is fed to the weld at a speed equal to that identified by the user input. Once the welding process commences, the controller will monitor voltage at the weld at step 56 based on voltage feedback. From the feedback, the controller will compare the actual arc voltage or voltage at the weld to the target voltage input by the user to the control menu. If the actual voltage at the weld exceeds the target voltage 58, 60, the controller will send a control signal to the drive assembly of the wire feeder causing an increase in WFS 62. Because voltage and WFS have an inverse relationship, an increase in the WFS will cause a decrease in the actual voltage. As such, the control signal transmitted to the drive assembly by the controller is designed to cause the drive assembly to increase the WFS to a level sufficient to drive the actual voltage to the target voltage level. As such, the difference between the actual voltage and the desired target voltage is reduced and, preferably, brought to zero.

If the actual arc voltage does not exceed the target voltage desired by the user 58, 64, the controller then determines if the actual voltage is less than the target voltage 66. If so 66, 68, the controller transmits a control signal to the wire drive assembly causing the drive assembly to decrease the speed by which the consumable electrode or welding wire is delivered to the weld 70. As noted above, voltage and WFS are inversely related; therefore, a decrease in WFS causes an increase in voltage. As such, the controller instructs the drive assembly to decrement the WFS to a level that will cause an increase in arc voltage to a level that reduces the difference between the target voltage and the actual arc voltage. Whether there is an increase in WFS, a decrease in WFS, or no change in the WFS, process 50 returns to step 56 with continued monitoring of the arc voltage. The monitoring and increment/decrement loop will be repeated throughout the welding process until the welding process ends at 74.

In an alternate embodiment, the controller may execute process 50 such that a comparison to a threshold value is carried out before an adjustment in WFS occurs. That is, the controller may compare the difference between actual arc voltage and the target arc voltage with an error threshold to first determine whether the difference between the actual and target voltages is at a level sufficient to cause a change in WFS. For instance, the controller and the wire feeder may be programmed such that a change in WFS command is not transmitted to the drive assembly until the absolute value of the difference between an actual arc voltage and target arc voltage exceeds one-half volt. In this regard, a minor below threshold deviation from the target voltage as a result of a transient condition will not cause a change in the WFS.

In yet another embodiment, the controller in executing process 50 may be programmed to execute a timing loop that determines if the difference between actual voltage and target voltage while not sufficient to warrant a change in WFS initially may be maintained over a significant time interval thereby indicating that the minor difference in actual voltage compared to target voltage has not been caused by a transient condition and is therefore indicative of a more permanent system condition. In this regard, the controller may then instruct the drive assembly to increment/decrement the wire feed speed despite the difference between actual voltage and target voltage being less than the set threshold.

Therefore, in accordance with one embodiment of the present invention, a wire feeder for a MIG welding system includes a power input configured to receive power at a substantially constant current level from a power source. The wire feeder also includes a drive assembly configured to introduce a consumable electrode to a weld at a WFS as well as a controller to set an initial WFS based on a user input. The controller is also configured to automatically adjust the WFS to reduce a difference between a target arc voltage and an actual arc voltage.

According to another embodiment of the present invention, a MIG welding system includes a power source configured to provide a constant current output. The welding system further includes a wire feeder connected to receive a constant current output and configured to deliver a consumable electrode to a weld at a WFS and automatically adjust the WFS to maintain the target voltage at the weld.

In accordance with yet a further embodiment of the present invention, a controller is provided to regulate output of a wire feeder. The controller is programmed to set an initial WFS and a target arc voltage for a CC welding process. The controller is further programmed to monitor a voltage level at a weld during the CC welding process and adjust WFS if the voltage level at the weld deviates from the target arc voltage.

In accordance with another embodiment of the present invention, a method of executing a constant current welding process is provided. The method includes the steps of receiving voltage feedback of a voltage at a weld and comparing the value of actual voltage at the weld to a target voltage. The method further includes a step of adjusting a speed of which consumable welding wire is delivered to the weld to reduce the difference between actual voltage and the target voltage.

In accordance with yet another embodiment of the invention, a controller is configured to regulate operating parameters of a wire feeder connected to a CC power source so as to duplicate a CV welding process on the CC power source below an arc voltage level of approximately 22 volts.

According to another embodiment, the present invention includes a wire feeder controller configured to receive a user input identifying a scaled representation of a voltage set point and determine a WFS from the scaled representation of the voltage set point.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

What is claimed is:

1. A wire feeder for an MIG welding system, the wire feeder comprising:
   a power input configured to receive power at a substantially constant current level from a power source;
   a drive assembly configured to introduce a consumable electrode to a weld at a wire feed speed; and
   a controller to set an initial wire feed speed based on a user input and automatically adjust the wire feed speed to reduce a difference between a target arc voltage and an actual arc voltage until termination of a weld.

2. The wire feeder of claim 1 wherein the controller is further configured to compare the actual arc voltage to the target arc voltage, set by a user, and, from the comparison, incrementally adjust the wire feed speed.

3. The wire feeder of claim 2 wherein the controller is further configured to decrease the wire feed speed if the actual arc voltage is less than the target arc voltage.

4. The wire feeder of claim 2 wherein the controller is further configured to increase the wire feed speed if the target arc voltage is less than the actual arc voltage.

5. The wire feeder of claim 1 wherein the controller is further configured to continuously monitor arc voltage during an MIG welding process.

6. The wire feeder of claim 1 further comprising a control panel configured to allow a user to select the initial wire feed speed and a scaled target arc voltage.

7. An MIG welding system comprising:
   a power source configured to provide a constant current output; and
   a wire feeder connected to receive the constant current output and configured to sustain a welding-type process by delivering a consumable electrode to a weld at a wire feed speed and automatically adjust the wire feed speed to maintain a target voltage at the weld; and
   wherein the wire feeder includes a menu designed to enable a user to input a desired target voltage and further includes a controller designed to read the input.

8. An MIG welding system comprising:
   a power source configured to provide a constant current output; and
   a wire feeder connected to receive the constant current output and configured to sustain a welding-type process by delivering a consumable electrode to a weld at a wire feed speed and automatically adjust the wire feed speed to maintain a target voltage at the weld; and
   wherein the wire feeder includes a controller configured to compare an actual voltage at the weld to the target voltage and adjust the wire feed speed to minimize a difference between the actual voltage and the target voltage.

9. The MIG welding system of claim 8 wherein the controller of the wire feeder is further configured to increase the wire feed speed if the actual voltage exceeds the target voltage.

10. The MIG welding system of claim 9 wherein the controller of the wire feeder is further configured to decrease the wire feed speed if the target voltage exceeds the actual voltage.

11. The MIG welding system of claim 8 wherein the wire feeder includes a voltage sensed wire feeder designed to at least operate based on voltage feedback from the weld.

12. A controller to regulate output of a wire feeder, the controller programmed to:
   set an initial wire feed speed and a target arc voltage for a constant current (CC) welding process;
   monitor a voltage level at a weld during the CC welding process; and
   adjust wire feed speed from the initial wire feed speed during the weld if the voltage level at the weld deviates from the target arc voltage independent of the constant current.

13. The controller of claim 12 further programmed to increase the wire feed speed if the voltage level at the weld is greater than the target arc voltage and decrease the wire feed speed if the voltage level at the weld is less than the target arc voltage.

14. The controller of claim 12 further programmed to receive a number of inputs from a user, and set the initial wire feed speed and the target arc voltage from the number of inputs.

15. The controller of claim 12 incorporated into a portable wire feeder configured to introduce consumable welding wire to the weld.

16. The controller of claim 15 wherein the wire feeder includes a drive assembly configured to introduce the consumable wire to the weld at a variable wire feed speed.

17. The controller of claim 15 wherein the portable wire feeder is further configured to receive a CC power input from a power source.

18. A method of executing a constant current welding process, the method comprising the steps of:
   receiving voltage feedback of voltage at a weld;
   comparing a value of actual voltage at the weld to a target voltage; and adjusting a speed of which consumable welding wire is delivered to the weld to reduce a difference between the actual voltage and the target voltage when the compared value is beyond a threshold.

19. The method of claim 18 wherein the step of adjusting includes the steps of:
increasing the speed if the actual voltage exceeds the target voltage; or
decreasing the speed if the target voltage exceeds the actual voltage.

20. A controller configured to regulate operating parameters of a wire feeder connected to a CC power source so as to duplicate a CV welding process on the CC power source below an arc voltage level of approximately 22 volts.

21. A wire feeder controller configured to:
receive a user input identifying a scaled representation of a voltage set point; and
determine a WFS from the scaled representation of the voltage set point and associated with a constant current delivered from a constant current power source.

* * * * *